(12) United States Patent
Bruno et al.

(10) Patent No.: US 10,293,946 B2
(45) Date of Patent: May 21, 2019

(54) HYBRID ELECTRIC

(71) Applicant: Hamilton Sundstrand Corporation, Windsor Locks, CT (US)

(72) Inventors: Louis J. Bruno, Ellington, CT (US); Thomas M. Zywiak, Southwick, MA (US); David W. Anderson, South Windsor, CT (US); Todd A. Spierling, Rockford, IL (US)

(73) Assignee: HAMILTON SUNDSTRAND CORPORATION, Windsor Locks, CT (US)

(*) Notice: Subject to any disclaimer, the term of this patent is extended or adjusted under 35 U.S.C. 154(b) by 302 days.

(21) Appl. No.: 15/176,651

(22) Filed: Jun. 8, 2016

(65) Prior Publication Data
US 2016/0355271 A1 Dec. 8, 2016

Related U.S. Application Data
(60) Provisional application No. 62/172,461, filed on Jun. 8, 2015.

(51) Int. Cl.
*B64D 13/08* (2006.01)
*B64D 13/06* (2006.01)

(52) U.S. Cl.
CPC ...... *B64D 13/08* (2013.01); *B64D 2013/0618* (2013.01); *B64D 2013/0644* (2013.01); *B64D 2013/0696* (2013.01); *Y02T 50/44* (2013.01); *Y02T 50/56* (2013.01)

(58) Field of Classification Search
CPC ............ B64D 13/08; B64D 2013/0644; B64D 2013/0618; Y02T 50/56
See application file for complete search history.

(56) References Cited

U.S. PATENT DOCUMENTS

| | | | |
|---|---|---|---|
| 5,899,085 A * | 5/1999 | Williams | B64D 13/06 62/236 |
| 6,058,715 A | 5/2000 | Strang et al. | |
| 6,629,428 B1 | 10/2003 | Murry | |
| 6,704,625 B2 | 3/2004 | Albero et al. | |
| 6,845,630 B2 | 1/2005 | Bruno et al. | |
| 7,305,842 B1 | 12/2007 | Schiff | |
| 7,322,202 B2 | 1/2008 | Zywiak et al. | |
| 7,578,136 B2 | 8/2009 | Derouineau et al. | |
| 7,970,497 B2 | 6/2011 | Derouineau et al. | |

(Continued)

FOREIGN PATENT DOCUMENTS

| | | |
|---|---|---|
| DE | 102010034830 A1 | 2/2012 |
| EP | 1279594 A1 | 1/2003 |
| EP | 2557034 A2 | 2/2013 |

OTHER PUBLICATIONS

ISR/WO, Issued Sep. 9, 2016.
Extended European Search Report for European Application No. 16808174.3 dated Jan. 18, 2019; 46 Pages.

*Primary Examiner* — Brian M O'Hara
(74) *Attorney, Agent, or Firm* — Cantor Colburn LLP

(57) ABSTRACT

An airplane is provided. The airplane includes a vapor cycle air conditioning system that receives outside air, a bleed system with at least one port, and an electric fan. A source of outside air when the airplane is on ground is forced air from the electric fan. The source of the outside air when the airplane is at cruise is bleed air from the at least one port.

11 Claims, 8 Drawing Sheets

(56) References Cited

U.S. PATENT DOCUMENTS

| | | | |
|---|---|---|---|
| 8,347,647 B2* | 1/2013 | McAuliffe | B64D 13/06 62/401 |
| 8,572,996 B2* | 11/2013 | Dittmar | B64D 13/06 62/236 |
| 8,662,445 B2 | 3/2014 | Bruno et al. | |
| 8,742,605 B1 | 6/2014 | Wilhide et al. | |
| 8,973,393 B2 | 3/2015 | Atkey et al. | |
| 9,254,920 B2 | 2/2016 | Zhou et al. | |
| 2002/0166923 A1 | 11/2002 | Munoz et al. | |
| 2008/0264084 A1 | 10/2008 | Derouineau et al. | |
| 2011/0108239 A1 | 5/2011 | Bruno et al. | |
| 2011/0138822 A1 | 6/2011 | Dittmar et al. | |
| 2012/0138737 A1 | 6/2012 | Bruno et al. | |
| 2014/0331692 A1 | 11/2014 | Eowsakul | |
| 2015/0065025 A1 | 3/2015 | Bruno et al. | |

* cited by examiner

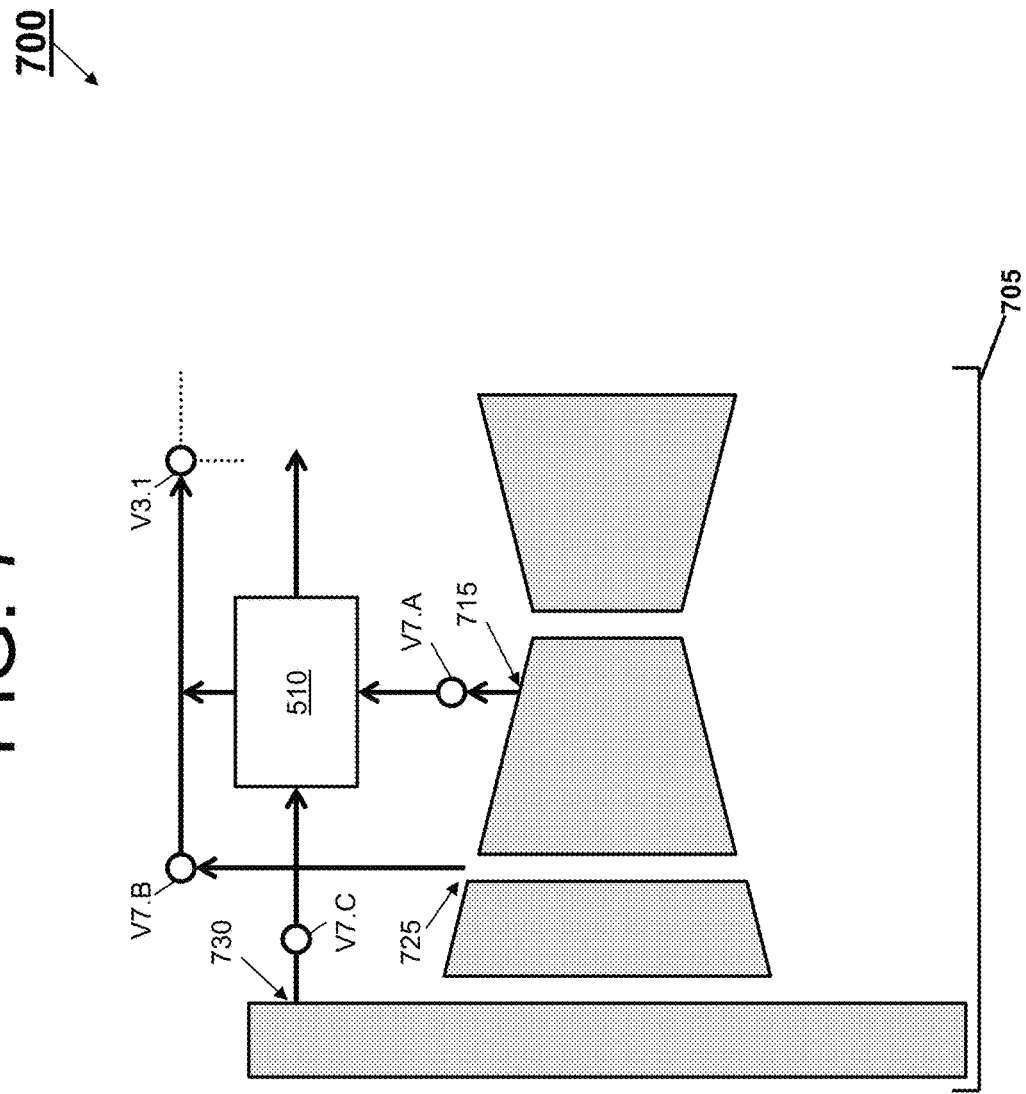

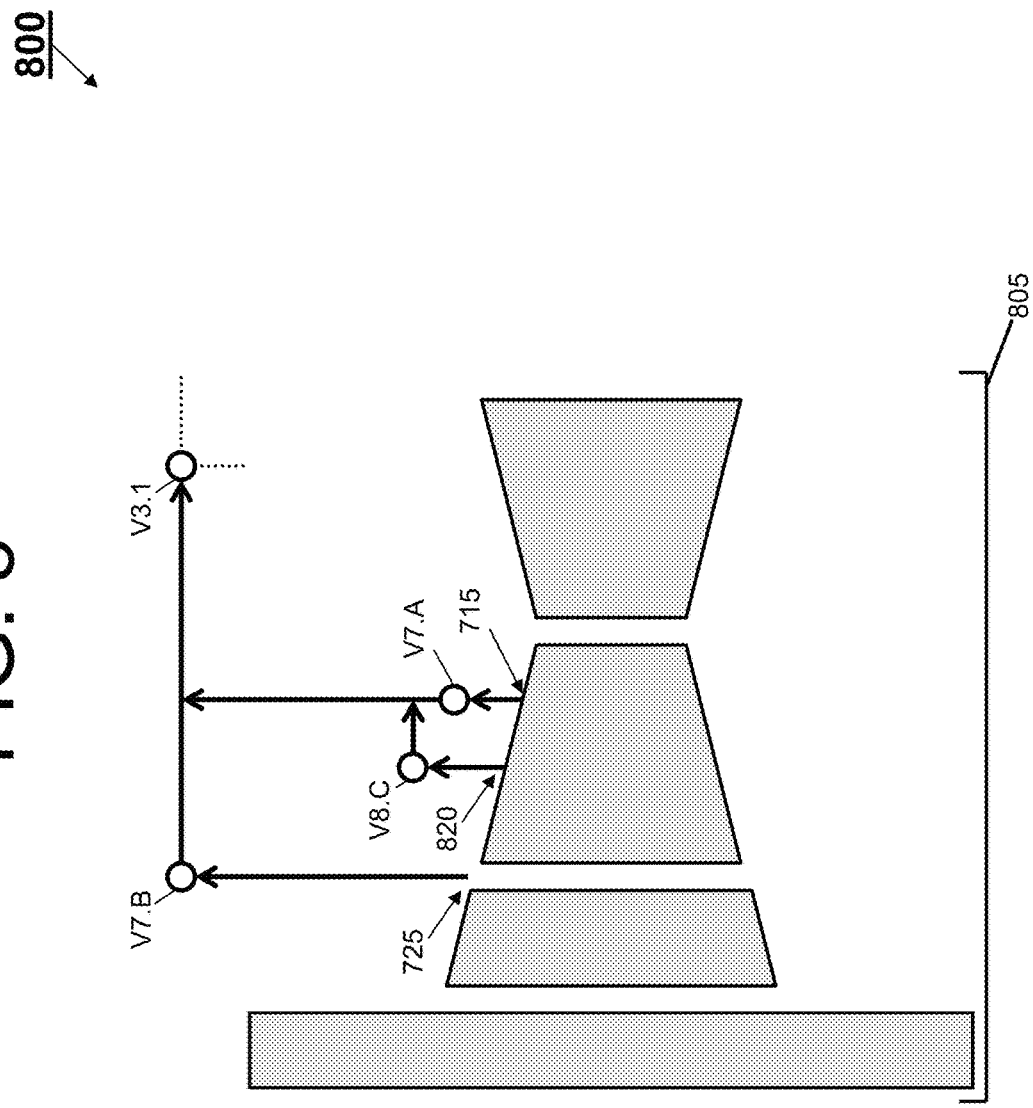

HYBRID ELECTRIC

CROSS REFERENCE TO RELATED APPLICATIONS

This application claims the benefit of an earlier filing date from U.S. Provisional Application Ser. No. 62/172,461 filed Jun. 8, 2015, the entire disclosure of which is incorporated herein by reference.

BACKGROUND

The trend in the aerospace industry today is towards systems with higher efficiency. To contemporary airplanes subsystems this means providing a same service at lower power. Unfortunately, the contemporary airplanes subsystems provide limited efficiency with respect to engine fuel burn at the lower power.

BRIEF DESCRIPTION

According to one embodiment, an airplane is provided. The airplane comprises a vapor cycle air conditioning system configured to receive outside air; a bleed system with at least one port; and an electric fan, wherein a source of outside air when the airplane is on ground comprises forced air from the electric fan, and wherein the source of the outside air during when the airplane is at cruise comprises bleed air from the at least one port.

Additional features and advantages are realized through the techniques of the embodiments herein. Other embodiments are described in detail herein and are considered a part of the claims. For a better understanding of the embodiments with the advantages and the features, refer to the description and to the drawings

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

FIG. 7 is a diagram of a schematic of a two port bleed system according to an embodiment; and FIG. 8 is a diagram of a schematic of a three port bleed system according to an embodiment.

DETAILED DESCRIPTION

A detailed description of one or more embodiments of the disclosed apparatus and method are presented herein by way of exemplification and not limitation with reference to the FIGS.

Figure 1:
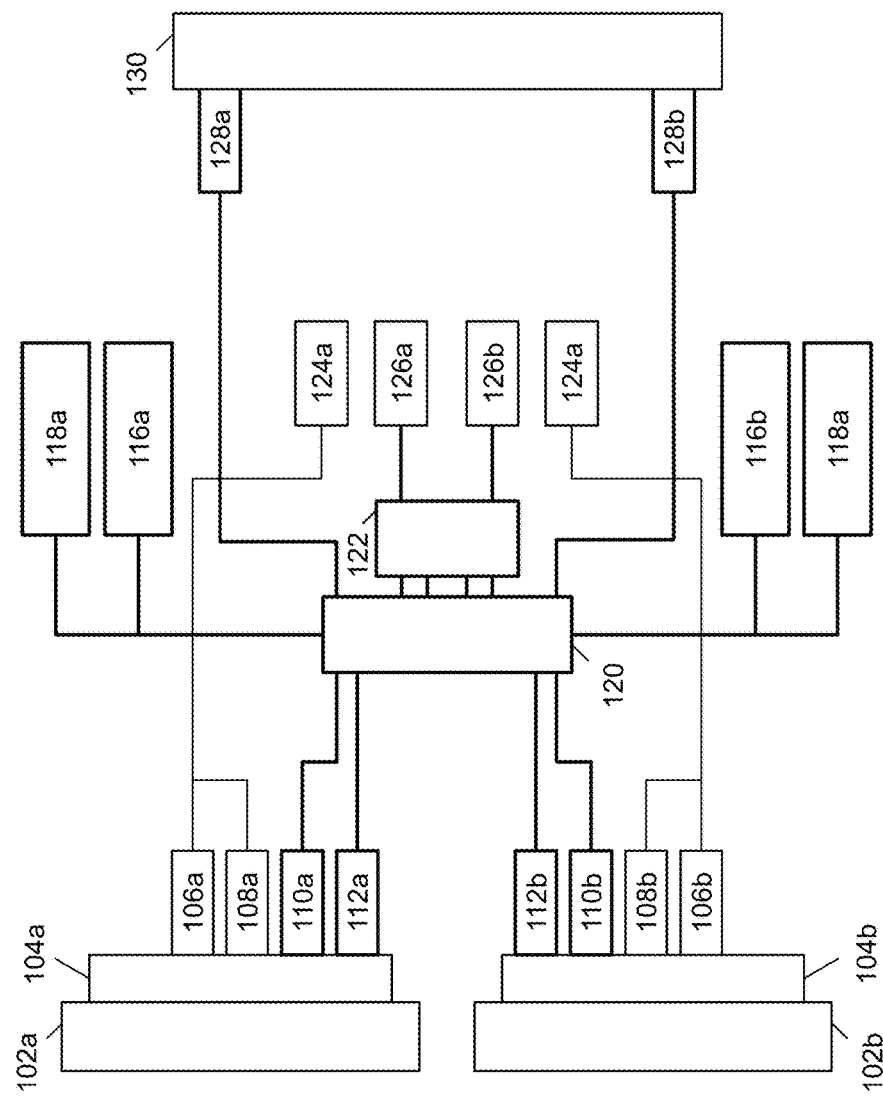
FIG. 1 is a diagram of a schematic of an electric airplane subsystem architecture according to an embodiment.

FIG. 1 is a diagram of a schematic of an electric airplane subsystem architecture 100 according to an embodiment. The electric airplane subsystem architecture 100 comprises at least one engine 102a and 102b; at least one gearbox 104a and 104b; at least one hydraulic element 106a, 106b, 108a, and 108b; at least one electrical element 110a, 110b, 112a, and 112b; at least one vapor cycle environmental control subsystem 116a and 116b; at least one wing anti-icing subsystem 118a and 118b; a power converter 120; a power distributor 122; at least one hydraulic actuator 124a, 124b, 126a, and 126b; at least one generator 128a and 128b; and at least one auxiliary power unit 130. Note that connecting lines and box outlines with a larger thickness are utilized to assist in identifying the electrical aspects of FIG. 1.

In the electric airplane subsystem architecture 100, the at least one vapor cycle environmental control subsystem 116a and 116b uses electric power, not bleed air, to pressurize and cool a cabin of an airplane. For instance, the at least one electrical element 110a, 110b, 112a, and 112b and the at least one generator 128a and 128b can provide power to the power converter 120, which in turn supplies power to the at least one vapor cycle environmental control subsystem 116a and 116b. Further, the other subsystems and operations, such as the at least one wing anti-icing subsystem 118a and 118b and a main engine start by the at least one auxiliary power unit 130 can be electric.

Utilizing electrical subsystems and operations has a significant impact on the airplane. For instance, conventional one auxiliary power units have load compressors that provide pressurized air to environmental control systems and are utilized for a main engine start. The at least one auxiliary power unit 130, since it is electric, eliminates the load compressor, along with bleed ducts from the at least one auxiliary power unit 130 to the at least one vapor cycle environmental control subsystem 116a and 116b. In fact, the use of the electrical subsystems and operations by the electric airplane subsystem architecture 100 eliminates bleed subsystems entirely (e.g., no pneumatic power results in no valves, no precooler, no bleed ducts, and no wing anti-ice ducting).

However, converting all of the pneumatic power to electric power has a significant impact on the electric airplane subsystem architecture 100, as the single largest power consuming operation is pressurizing the cabin. For instance, converting cabin pressurization from pneumatic to electric has resulted in an amount of electrical power required from the at least one engine 102a and 102b to be increased by approximately a factor of 5. This amount of required electrical power has caused the electric airplane subsystem architecture 100 to include very large electrical elements such as the motor drives and rectifier units of the power converter 120. The inclusion of the very large motor drives and rectifier units then required a liquid cooling system to reject the heat generated by the power converter 120 overboard. The combination of these additional elements has resulted in a significant amount of subsystem weight, which is enough reduce or negate the benefits of the lower power.

Embodiments herein provide a hybrid electric airplane subsystem architecture that utilizes lower power and does not increase the air plane weight significantly.

Figure 2:
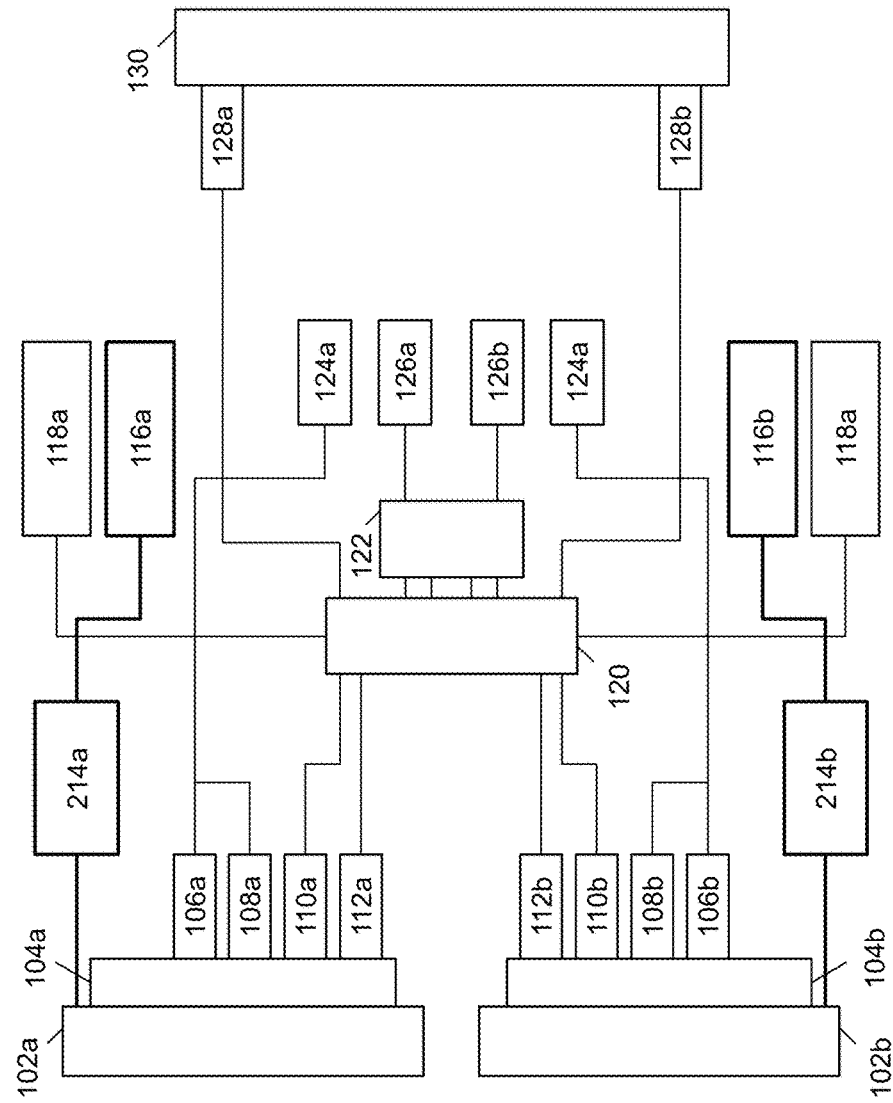
FIG. 2 is a diagram of a schematic of a hybrid electric airplane subsystem architecture according to an embodiment.

Turning now to FIG. 2, a diagram of a schematic of a hybrid electric airplane subsystem architecture 200 is provided according to an embodiment. Some of the elements of the electric airplane subsystem architecture 100 of FIG. 1 are reused for ease of explanation. The additional components of hybrid electric airplane subsystem architecture 200 comprise at least one bleed system 214a and 214b. The at least one bleed system 214a and 214b is utilized for pressurization and air supply, while other operations of the hybrid electric airplane subsystem architecture 200 can remain the same as the electric airplane subsystem architecture 100 (e.g., cabin cooling, wing anti-icing, and main engine start can be electric). Utilizing the at least one bleed system 214a and 214b for pressurization and air supply significantly reduces the amount of electrical power required by the hybrid electric airplane subsystem architecture 200 and, thereby, eliminates the large motor drives and rectifier units of the electric airplane subsystem architecture 100. In turn, Utilizing the at least one bleed system 214a and 214b for pressurization and air supply reduces the weight and eliminates a need for liquid cooling. Further, because both the main engine start and the cabin cooling are electric, the at least one auxiliary power unit 130 is electric, which will continue to eliminate the load compressor and the bleed ducts (to/from the at least one auxiliary power unit 130) with respect to conventional one auxiliary power units.

In addition, the electric airplane subsystem architecture 100 includes two variable frequency starter generators mounted on the at least one engine 102a and 102b. In the engine start mode the two variable frequency starter generators receive power from the large motor drives from the at least one auxiliary power unit 130.

Figure 3:
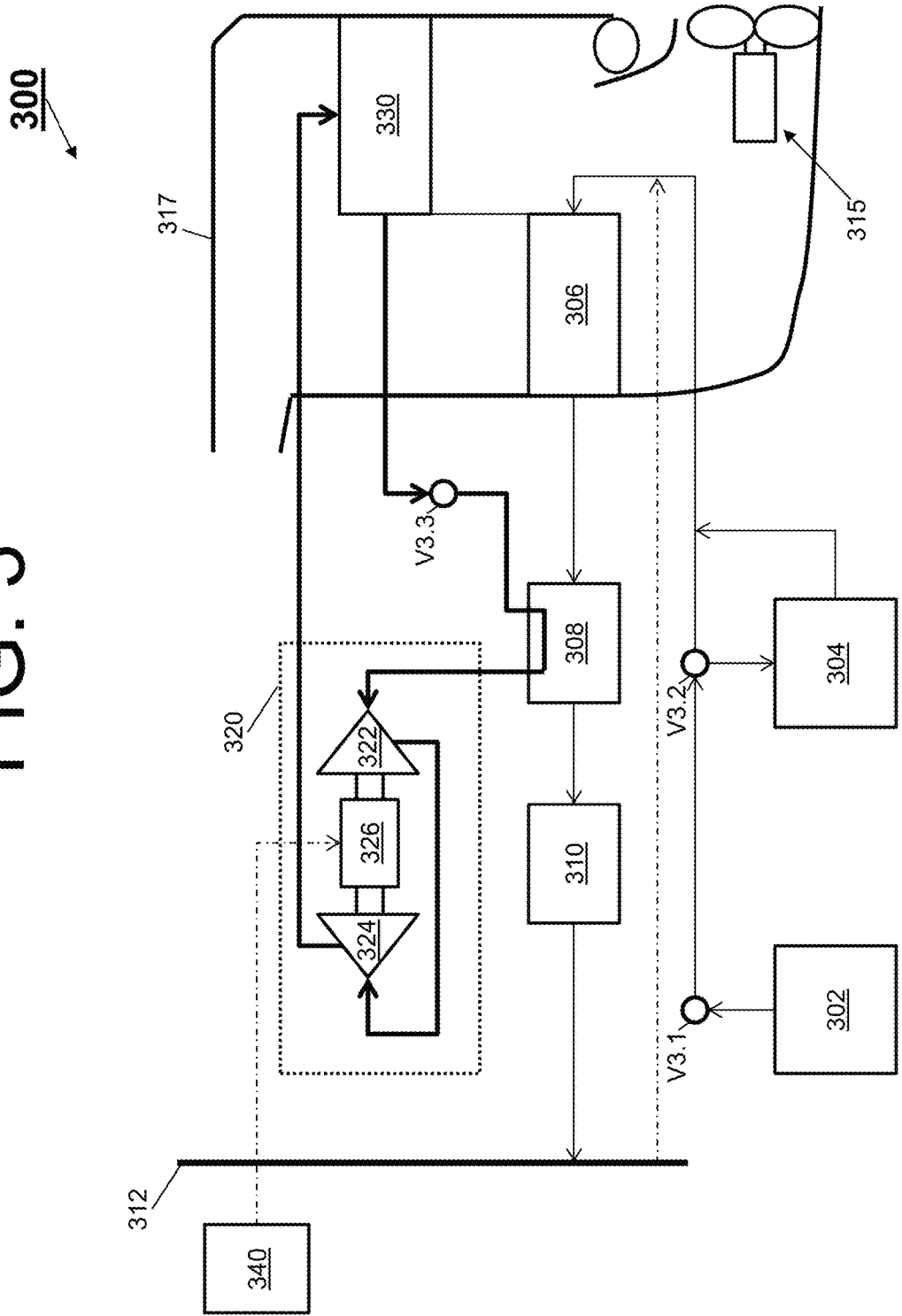
FIG. 3 is an example of an environmental control system schematic according to an embodiment.
Figure 4:
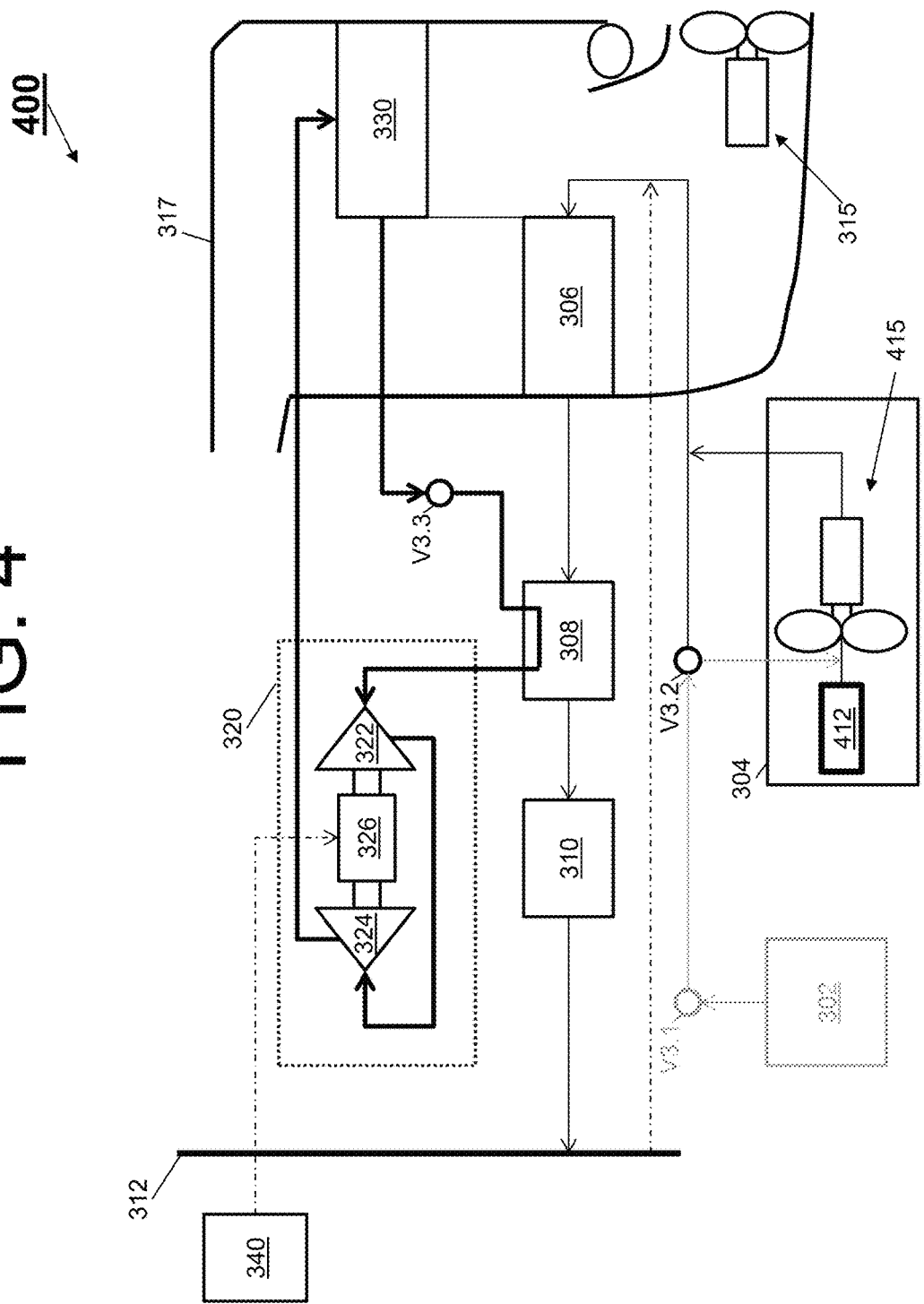
FIG. 4 is an operational example of a ground cooling mode of the environmental control system schematic of FIG. 3 according to an embodiment.
Figure 5:
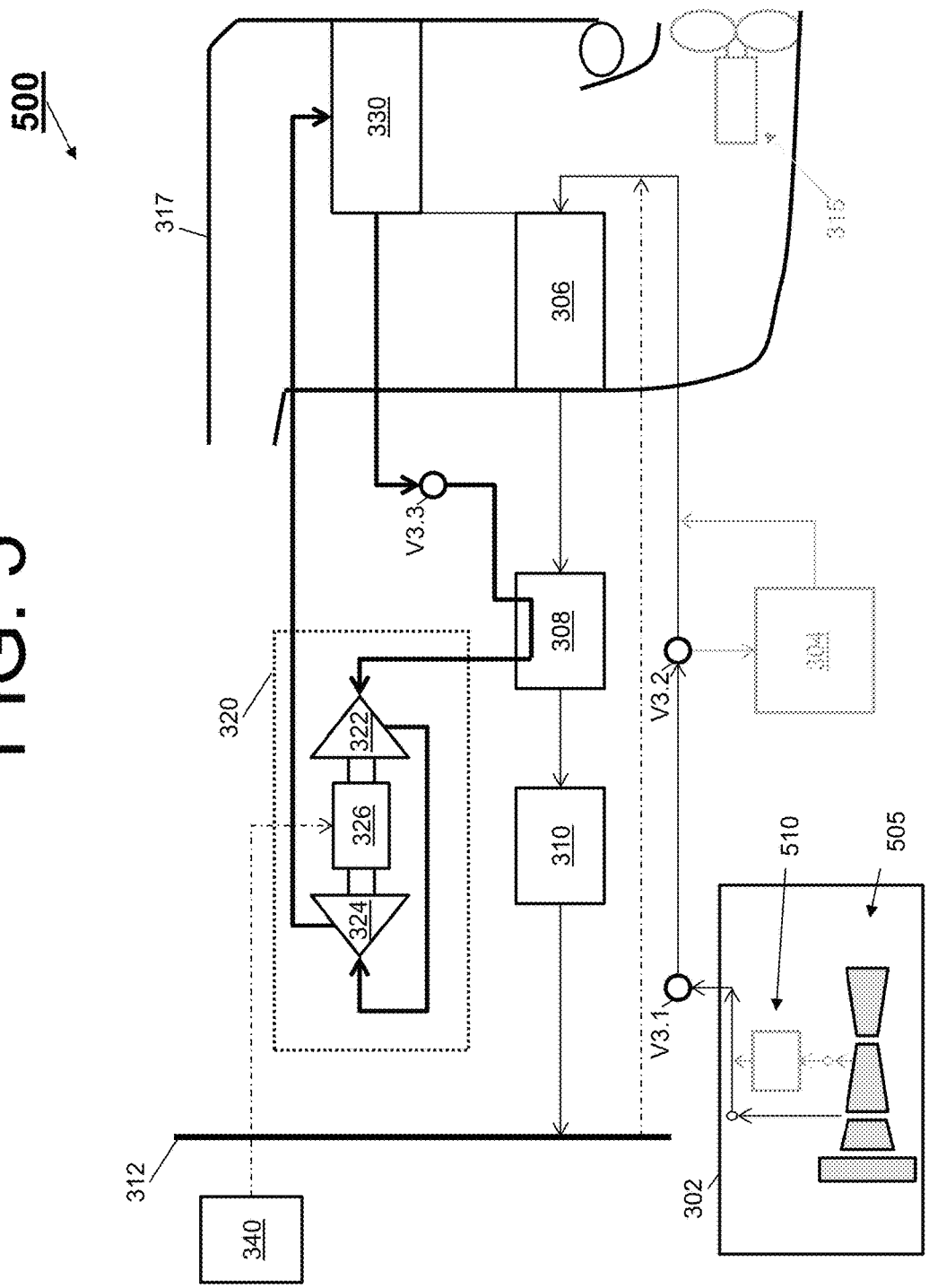
FIG. 5 is an operational example of a flight mode of the environmental control system schematic of FIG. 3 according to an embodiment.
Figure 6:
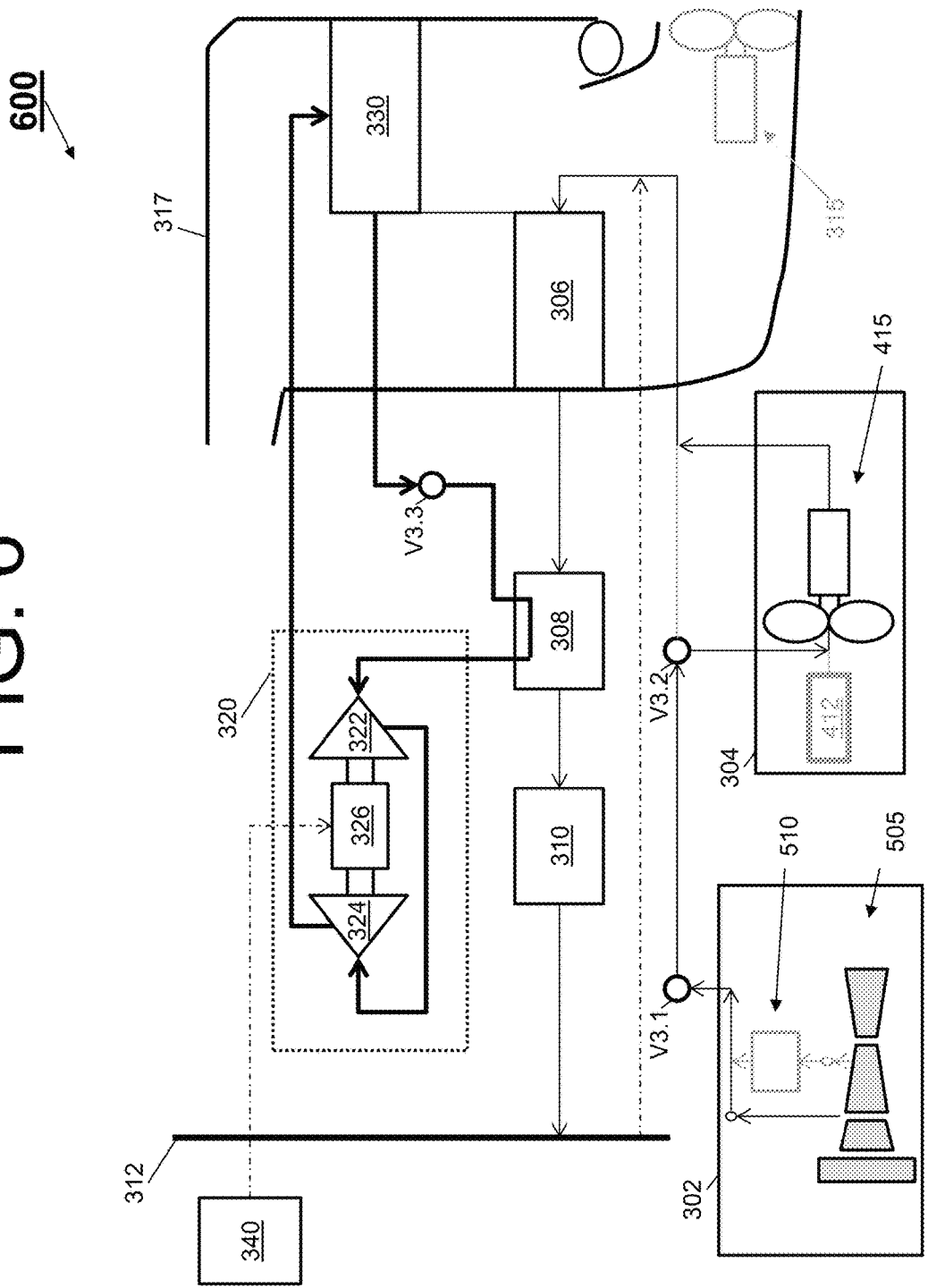
FIG. 6 is an operational example of a boost mode of the environmental control system schematic of FIG. 3 according to an embodiment.

In contrast, the hybrid electric airplane subsystem architecture 200 utilizes the at least one auxiliary power unit 130 to provide power, while the at least one engine 102a and 102b has corresponding starter drive generators (motor/generator). The starter drive generators have a built-in mechanical transmission (similar to an integrated drive generator). Further, engine start is accomplished by using a small air-cooled motor drive used for the cabin cooling. In operation, the at least one auxiliary power unit 130 provides power to the air-cooled motor drive; the air-cooled motor drive spins up a starter drive generator to a speed associated with an airplane bus frequency; the starter drive generator is then placed on an electric bus; the starter drive generator turns an associated engine (e.g., end of the engines 102a and 102b) via the mechanical transmission until an engine speed is high enough to start the associated engine The hybrid electric airplane subsystem architecture 200 will now be described with respect to FIGS. 3, 4, 5, 6, 7, and 8. FIG. 3 is an example of an environmental control system schematic 300 within the hybrid electric airplane subsystem architecture 200 of FIG. 2 according to an embodiment. FIG. 4 is an operational example of a ground cooling mode 400 of the environmental control system schematic 300 of FIG. 3 according to an embodiment. FIG. 5 is an operational example of a flight mode 500 of the environmental control system schematic 300 of FIG. 3 according to an embodiment. FIG. 6 is an operational example of a boost mode 600 of the environmental control system schematic 300 of FIG. 3 according to an embodiment. FIG. 7 is a diagram of a schematic of a two port bleed system 700 according to an embodiment. FIG. 8 is a diagram of a schematic of a three port bleed system 800 according to an embodiment. Elements of FIGS. 3, 4, 5, 6, 7, and 8 that are reused for ease of explanation will not be reintroduced.

Turning to FIG. 3, the environmental control system schematic 300 comprises an engine bleed system 302, an ambient fresh air system 304, a ram air heat exchanger 306, an evaporator heat exchanger 308, an electric heater 310, a chamber 312 (e.g., cabin or flight deck of the airplane), a fan 315, a shell 317, a vapor cycle compressing device 320 (which includes vapor cycle compressors 322 and 324 and a motor 326), a condenser 330, and an air cooled motor controller 340, along with a plurality of valves (e.g., a valve V3.1, a valve V 3.2, and an expansion valve V3.3.

The environmental control system schematic 300 employs a vapor cycle to cool the chamber 312. One or more mediums can be sourced from the engine bleed system 302, the ambient fresh air system 304, and/or the chamber 312 based on the operation of the valves V3.1 and V3.2. One or more mediums can also be drawn into the shell 319, e.g., based on the operation of the electrical fan 315. The medium can generally be air (such as bleed air or outside air), while other examples include gases, liquids, fluidized solids, or slurries. In an embodiment, the environmental control system schematic 300 can receive outside air in the form of bleed air from an engine (via the engine bleed system 302) and/or in the form of ambient air via a cabin air supply fan (via the ambient fresh air system 304 as further described below).

The ram air heat exchanger 306 reduces a temperature of the medium that is destined for the chamber 312, prior to the medium entering the evaporator heat exchanger 308. The evaporator heat exchanger 308 absorbs heat from the medium. The electric heater 310 raises the temperature of the medium prior to the medium being sent to the cabin. The electric fan 315 is used to pull ram air (ambient or outside air) through the shell 319, the ram air heat exchanger 306, and the condenser 330. The air cooled motor controller 340 drives the vapor cycle compressors 322 and 324 of the vapor cycle compressing device 320 via the motor 326 and can be used to start an engine of the airplane. The condenser 330 rejects heat to ambient air via a ram circuit (e.g., operation of the ram air flowing through the shell 317).

Turning now to FIG. 4, the ground cooling mode 400 of the environmental control system schematic 300 will now be described. FIG. 4 includes further illustrations with respect to the ambient fresh air system 304. As shown in FIG. 4, the ambient bleed system 304 includes a cabin air supply fan 415, which is used during the ground cooling mode 400. The cabin air supply fan 415 can also be used during a portion of airplanes climb and descent conditions (e.g., near the ground). Further, the cabin air supply fan 415 can be used to boost a pressure of the bleed air during high altitude cruise conditions (with respect to FIG. 5).

In the ground cooling mode 400, the cabin air supply fan 415 pushes (or pulls) outside air 412 into the ram air heat exchanger 306 where it is cooled by the ram air in the shell 319. The ram air is pulled through ram air heat exchanger 306 by the electric ram fan 315. Cabin recirculation air from the chamber 312 can be mixed with the outside air 412 before the outside air 412 enters the ram air heat exchanger 306. The evaporator heat exchanger 308 cools and dehumidifies air exiting the ram air heat exchanger 306 and sends it to the chamber 312 via the electric heater 310.

A source of cooling for the evaporator heat exchanger 308 is a refrigeration or vapor cycle. The vapor cycle is closed loop system that absorbs heat at a low temperature and rejects heat at a high temperature. In the evaporator heat exchanger 308, a refrigerant (in a liquid or combination of liquid and gaseous state) absorbs heat from the air exiting the ram air heat exchanger 306 and goes through a phase change. For instance, the refrigerant exits the evaporator heat exchanger 308 as a superheated gas and enters the compressors 322 and 324. The compressors 322 and 324 pressurize the superheated gas and further raise its temperature to produce a high pressure high temperature refrigerant. The high pressure high temperature refrigerant enters the condenser 330 and is condensed into a liquid refrigerant. The liquid leaving the condenser enters the expansion valve V3.3, where the pressure is reduced and the temperature of the liquid refrigerant drops to produce a cold refrigerant. The cold refrigerant then enters the evaporator heat exchanger 308, which closes the loop.

A cooling source for the condenser 330 is the ram air (as is the case for the ram air heat exchanger 306) that air is pulled through it by the electric ram air fan 315. The environmental control system schematic 300 also contains the electric heater 310 that can be used to raise the temperature of the air exiting the evaporator heat exchanger 308 on cold day cases. The ground cooling mode 400 of operation is used on the ground during ground idle, taxi, and take-off. The ground cooling mode 400 can also be used at low altitude climb and approach Turning now to FIG. 5, the flight mode 500 of the environmental control system schematic 300 will now be described. FIG. 5 includes further illustrations with respect to the engine bleed system 302. As shown in FIG. 5, the engine bleed system 302 includes an engine 505 and a precooler 510 (which can be designed to provide 400° F. to 450° F. air). The flight mode 500 operates in much the same way as the ground cooling mode 400. In addition, the flight mode 500 includes alternative air sources and electric fan operation. For instance, in the flight mode 500, bleed air sourced from the engine 505 is utilized instead of outside air 412 pushed by the cabin air supply fan and is sent to the cabin. The bleed air sourced from the engine 505 can be from a low pressure bleed port as described in FIGS. 7 and 8. Further, both the electric fan 315 and the cabin air supply fan 415 can be turned off. The flight mode 500 of operation is used during cruise conditions and climb and descent conditions.

Turning now to FIG. 6, the boost mode 600 of the environmental control system schematic 300 will now be described. The boost mode 600 of operation is used during cruise conditions when engine bleed pressure is insufficient to move the bleed air from the engine 505 and into the chamber 312 through the heat exchangers 306 and 308. For example, when a pressure of the bleed air sourcing from the low pressure bleed port of the engine 505 is too low with respect to a pressure of the chamber 312, the bleed air can be directed valve V3.2 through the cabin air supply fan 415 so that it is pressurized above the pressure of the chamber 312. This, in turn, allows the bleed air to flow through the environmental control system schematic 300 at high altitude cruse conditions. Note that the electric fan 315 supply fan 415 can be turned off in the boost mode 600.

Turning now to FIGS. 7 and 8, a selection of location for a plurality of ports for the engine bleed system 302 (e.g., the two port bleed system 700 or the three port bleed system 800) will now be described. In FIG. 7, an example of engine bleed system 302 is shown as the two port bleed system 700 according to an embodiment. The two port bleed system 700 includes an engine 705 that provides bleed air from a plurality of ports (a first port 715 and a second port 725) to the valve V3.1. The two port bleed system 700 also includes fan air 730 that is extracted from a fan stream and utilized by the precooler 510 to receive heat rejected from bleed air from the first port 715. The two port bleed system 700 also includes a plurality of valves V7.A, V7.B, and V7.C from managing the bleed ports 715 and 725 and the fan air 730. Note that locations of the ports of the two port bleed system 700 can be selected within the engine 705 so that one or more of a reduction of size of the precooler 510, a bypassing of the precooler 510, and a deletion of the precooler 510 can result. For instance, if the precooler 510 is needed for certain operating condition, then the precooler 510 can be a reduced size to meet those conditions. For example, since at least one wing anti-icing subsystem 118a and 118b is electric, the precooler 510 can be approximately ⅓ the size of conventional precooler that are sized for failure modes.

The first port 715 can be a high pressure bleed port, selected from a location of the engine 705 that provides bleed air with the characteristics of being high enough to pressurize the cabin during idle descent. The second port 725 can be a low pressure bleed port, selected from a location of the engine 705 that provides bleed air with the characteristics of having a pressure high enough to pressurize the cabin and provides a temperature low enough not to go through the precooler 510.

Turning now to FIG. 8, an example of engine bleed system 302 is shown as the three port bleed system 800 according to an embodiment. The three port bleed system 800 includes an engine 805 that provides bleed air from a plurality of ports (a first port 715, a second port 725, and intermediary port 820) to the valve V3.1. The intermediate port 820 can be selected from a location of the engine 805 based on engine bleed pressure, cabin pressure, and the cabin air supply fan 415. The result of this configuration can be a deletion of the precooler 510. That is, if the three port bleed system 800 enables bleed ports with temperatures below an auto-ignition temperature of fuel, then the precooler 510 can be bypassed or deleted all together, For example, by combining the use of the cabin air supply fan 415 with the three port bleed system 800, results in a bleed system that doesn't require a precooler. Thus, the three port bleed system 800 excludes the precooler 510. Note that this architecture can use a starter drive generator or a variable frequency starter generator can also be used. If the architecture uses the variable frequency starter generator, multiple air cooled motor drives can be linked together to drive the variable frequency starter generator during engine start.

In view of the above, a technical effect and benefit of the hybrid electric airplane subsystem architecture 200 includes elimination of high power conversion equipment and with it, the liquid cooling system. For instance, because the liquid cooling system is required to transfer the power conversion equipment waste heat out of the pressurized vessel, the elimination of the pressurization requirement reduces the power conversion equipment (motor controller) waste heat by ~90%.

According to an embodiment, an airplane is provided. The airplane comprises a vapor cycle air conditioning system configured to receive outside air; a bleed system with at least one port; and an electric fan, wherein a source of outside air when the airplane is on ground comprises forced air from the electric fan, and wherein the source of the outside air during when the airplane is at cruise comprises bleed air from the at least one port.

According to another embodiment or the airplane embodiment above, the airplane can comprises a motor drive configured to provide electric power to the vapor cycle air conditioning system.

According to another embodiment or any of the airplane embodiments above, the motor drive can be air cooled.

According to another embodiment or any of the airplane embodiments above, the motor drive can be configured to start an engine of the airplane.

According to another embodiment or any of the airplane embodiments above, the airplane can comprise a starter drive generator mounted on the engine of the airplane.

According to another embodiment or any of the airplane embodiments above, the motor drive can supply power to the starter drive generator.

According to another embodiment or any of the airplane embodiments above, the airplane can comprise a variable frequency starter drive generator mounted on the engine.

According to another embodiment or any of the airplane embodiments above, the motor drive can supply power to the variable frequency starter generator.

According to another embodiment or any of the airplane embodiments above, the electric fan can be configured to boost a pressure of the bleed air.

According to another embodiment or any of the airplane embodiments above, the at least one port of the bleed system can be configured at a location of an engine of the airplane to enable at least one of a reduction of size of a precooler, a bypassing of the precooler, and a deletion of the precooler.

According to another embodiment or any of the airplane embodiments above, a first port of the at least one port can be configured to cause the bleed air to bypass a precooler.

According to another embodiment or any of the airplane embodiments above, the airplane can comprise at least one wing anti-icing subsystem configured to be electrically powered.

Aspects of the embodiments are described herein with reference to flowchart illustrations, schematics, and/or block diagrams of methods, apparatus, and/or systems according to embodiments. Further, the descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of embodiments herein. For instance, the steps may be performed in a differing order or steps may be added, deleted or modified. All of these variations are considered a part of the claims.

While the preferred embodiment has been described, it will be understood that those skilled in the art, both now and in the future, may make various improvements and enhancements which fall within the scope of the claims which follow. These claims should be construed to maintain the proper protection.

The invention claimed is:

1. An airplane comprising:
a vapor cycle air conditioning system that provides air pressurization and supply to a chamber of the airplane;
a bleed system with at least one port; and
an electric cabin air supply fan,
wherein the vapor cycle air conditioning system utilizes forced air to provide the air pressurization and supply when the airplane is on ground, the forced air being outside air that is pushed or pulled into the vapor cycle air conditioning system by the electric cabin air supply fan, and
wherein the vapor cycle air conditioning system utilizes bleed air sourced from the at least one port to provide the air pressurization and supply when the airplane is at cruise, the cabin air supply fan boosting a pressure of the bleed air while the airplane is at cruise.

2. The airplane of claim 1, comprising a motor drive configured to provide electric power to the vapor cycle air conditioning system.

3. The airplane of claim 2, wherein the motor drive is air cooled.

4. The airplane of claim 2, wherein the motor drive is configured to start an engine of the airplane.

5. The airplane of claim 4, comprising a starter drive generator mounted on the engine of the airplane.

6. The airplane of claim 5, wherein the motor drive supplies power to the starter drive generator.

7. The airplane of claim 4, comprising a variable frequency starter drive generator mounted on the engine.

8. The airplane of claim 7, wherein the motor drive supplies power to the variable frequency starter generator.

9. The airplane of claim 1, wherein the at least one port of the bleed system is at a location of an engine of the airplane providing at least one of a reduction of size of a precooler, a bypassing of the precooler, and a deletion of the precooler.

10. The airplane of claim 1, wherein a first port of the at least one port is configured to cause the bleed air to bypass a precooler.

11. The airplane of claim 1, comprising at least one wing anti-icing subsystem configured to be electrically powered.

* * * * *